(12) United States Patent
Braun et al.

(10) Patent No.: US 12,160,932 B2
(45) Date of Patent: *Dec. 3, 2024

(54) PASSIVE BACKPLANE ARCHITECTURE FOR MASTER UNIT OF DISTRIBUTED ANTENNA SYSTEM

(71) Applicant: Outdoor Wireless Networks LLC, Claremont, NC (US)

(72) Inventors: Patrick Braun, Munningen (DE); Christoph Gollinger, Bayern (DE)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,409

(22) Filed: May 4, 2023

(65) Prior Publication Data

US 2023/0276536 A1 Aug. 31, 2023

Related U.S. Application Data

(63) Continuation of application No. 17/033,013, filed on Sep. 25, 2020, now Pat. No. 11,690,135.

(Continued)

(51) Int. Cl.
*H04L 25/02* (2006.01)
*H04W 16/24* (2009.01)
*H04W 88/08* (2009.01)

(52) U.S. Cl.
CPC .......... *H04W 88/085* (2013.01); *H04L 25/02* (2013.01); *H04W 16/24* (2013.01)

(58) Field of Classification Search
CPC ...... H04W 88/085; H04W 16/24; H04L 25/02
See application file for complete search history.

(56) References Cited

U.S. PATENT DOCUMENTS

| 5,428,806 A | 6/1995 | Pocrass |
| 5,485,455 A | 1/1996 | Dobbins et al. |

(Continued)

FOREIGN PATENT DOCUMENTS

| KR | 20140033176 A | 3/2014 |
| WO | 2012097332 A2 | 7/2012 |

OTHER PUBLICATIONS

European Patent Office, "Extended European Search Report", from EP Application No. 20867340.0 from Foreign Counterpart to U.S. Appl. No. 17/033,013, Aug. 23, 2023, pp. 1 through 10, Published: EP.

(Continued)

*Primary Examiner* — Hai V Nguyen
(74) *Attorney, Agent, or Firm* — Fogg & Powers LLC

(57) ABSTRACT

One embodiment is directed to a distributed antenna system (DAS) for use with one or more base stations. The DAS comprises a plurality of remote antenna units, one or more donor units, and one or more transport units. The DAS is configured to communicatively couple each donor unit to at least one of the transport units and to communicatively couple each transport unit to at least one of the donor units. The DAS is configured so that all active downlink digital processing for producing the downlink transport signals transmitted from the transport units to the remote antenna units is performed by the donor units and the transport units. The DAS is configured so that all active uplink digital processing of the uplink transport signals received by the transport units from the remote antenna units is performed by the donor units and the transport units.

33 Claims, 8 Drawing Sheets

Related U.S. Application Data

(60) Provisional application No. 62/906,602, filed on Sep. 26, 2019.

(56) References Cited

U.S. PATENT DOCUMENTS

| | | | |
|---|---|---|---|
| 5,594,726 A | 1/1997 | Thompson et al. | |
| 5,751,710 A | 5/1998 | Crowther et al. | |
| 6,334,219 B1 | 12/2001 | Hill et al. | |
| 6,415,133 B1* | 7/2002 | Brede | H04L 27/2601 |
| | | | 375/E7.002 |
| 6,611,526 B1 | 8/2003 | Chinnaswamy et al. | |
| 6,831,901 B2* | 12/2004 | Millar | H04W 88/085 |
| | | | 370/328 |
| 7,039,073 B1 | 5/2006 | Muntz et al. | |
| 7,083,422 B2 | 8/2006 | Campini et al. | |
| 7,630,301 B2 | 12/2009 | Lund et al. | |
| 7,668,153 B2* | 2/2010 | Zavadsky | H04J 3/0685 |
| | | | 370/506 |
| RE41,771 E | 9/2010 | Geile et al. | |
| RE42,236 E | 3/2011 | Geile et al. | |
| 7,917,675 B2 | 3/2011 | Murphy et al. | |
| 8,213,401 B2* | 7/2012 | Fischer | H04W 88/085 |
| | | | 370/345 |
| 8,346,278 B2* | 1/2013 | Wala | G01S 5/0221 |
| | | | 370/320 |
| 8,526,970 B2* | 9/2013 | Wala | H04W 4/02 |
| | | | 370/320 |
| 8,583,100 B2* | 11/2013 | Koziy | H04W 88/085 |
| | | | 455/422.1 |
| 8,737,454 B2* | 5/2014 | Wala | H04B 1/18 |
| | | | 375/220 |
| 8,743,852 B2 | 6/2014 | Mujtaba et al. | |
| 8,744,504 B2 | 6/2014 | Faccin et al. | |
| 8,867,451 B2* | 10/2014 | Kummetz | H04W 24/02 |
| | | | 370/328 |
| 8,929,288 B2* | 1/2015 | Stewart | H04B 7/024 |
| | | | 455/560 |
| 8,958,410 B2* | 2/2015 | Fischer | H04W 88/085 |
| | | | 370/345 |
| 8,966,058 B2 | 2/2015 | Velaga et al. | |
| 9,043,526 B2* | 5/2015 | Freking | G06F 13/4018 |
| | | | 710/307 |
| 9,098,434 B2 | 8/2015 | Chhabra et al. | |
| 9,107,086 B2 | 8/2015 | Leimeister et al. | |
| 9,167,452 B2* | 10/2015 | Lundström | G06F 11/2028 |
| 9,172,639 B2* | 10/2015 | Cors | H04L 45/44 |
| 9,177,157 B2 | 11/2015 | Binder | |
| 9,292,460 B2* | 3/2016 | Freking | G06F 13/4018 |
| 9,379,906 B2 | 6/2016 | Sharma et al. | |
| 9,385,797 B2 | 7/2016 | Zavadsky et al. | |
| 9,398,464 B2* | 7/2016 | Kummetz | H04W 16/26 |
| 9,413,439 B2 | 8/2016 | Faccin et al. | |
| 9,490,864 B2 | 11/2016 | Mujtaba et al. | |
| 9,602,210 B2 | 3/2017 | Berlin et al. | |
| 9,712,343 B2* | 7/2017 | Dussmann | H04W 52/52 |
| 9,735,843 B2* | 8/2017 | Kummetz | H04B 7/022 |
| 9,735,999 B2 | 8/2017 | Kummetz et al. | |
| 9,749,173 B2 | 8/2017 | Gautam et al. | |
| 9,762,547 B2 | 9/2017 | Binder | |
| 9,762,562 B2 | 9/2017 | Maguire et al. | |
| 9,768,840 B2 | 9/2017 | Faccin et al. | |
| 9,800,298 B2* | 10/2017 | Stewart | H04W 88/085 |
| 9,813,229 B2* | 11/2017 | Saban | H04L 7/0331 |
| 9,929,810 B2* | 3/2018 | Berlin | H04Q 11/0005 |
| 9,948,329 B2* | 4/2018 | Saban | H04B 7/0413 |
| 10,063,287 B2* | 8/2018 | Kummetz | H04B 17/318 |
| 10,186,910 B2* | 1/2019 | Johnson | H04L 43/16 |
| 10,230,768 B2 | 3/2019 | Huntwork et al. | |
| 10,256,871 B2* | 4/2019 | Stewart | H04B 7/022 |
| 10,271,380 B2* | 4/2019 | Dussmann | H04L 25/026 |
| RE47,466 E* | 6/2019 | Fischer | H04L 65/80 |
| 10,348,424 B2* | 7/2019 | Schmidt, Jr. | H04B 1/10 |
| 10,396,956 B2* | 8/2019 | Li | H04W 88/085 |
| 10,485,004 B2* | 11/2019 | Tarlazzi | H04B 17/12 |
| 10,554,242 B2* | 2/2020 | Wala | H04W 88/085 |
| 10,644,761 B2 | 5/2020 | Faccin et al. | |
| 10,644,814 B2* | 5/2020 | Schmidt, Jr. | H04B 1/10 |
| 10,652,214 B2 | 5/2020 | Binder | |
| 10,798,667 B2* | 10/2020 | Raghothaman | H04W 52/0206 |
| 10,924,243 B2* | 2/2021 | Li | H04L 27/2692 |
| 10,938,450 B2* | 3/2021 | Kummetz | H04W 16/04 |
| 11,690,135 B2* | 6/2023 | Braun | H04L 25/02 |
| | | | 455/561 |
| 2008/0181282 A1 | 7/2008 | Wala et al. | |
| 2010/0177759 A1* | 7/2010 | Fischer | H04W 88/085 |
| | | | 370/345 |
| 2011/0201368 A1 | 8/2011 | Faccin et al. | |
| 2012/0314797 A1 | 12/2012 | Kummetz et al. | |
| 2013/0003658 A1* | 1/2013 | Stewart | H04B 7/024 |
| | | | 370/328 |
| 2013/0010786 A1 | 1/2013 | Wethington et al. | |
| 2013/0016632 A1 | 1/2013 | Mujtaba et al. | |
| 2013/0017863 A1* | 1/2013 | Kummetz | H04B 17/318 |
| | | | 455/562.1 |
| 2013/0182708 A1 | 7/2013 | Sharma et al. | |
| 2013/0201916 A1 | 8/2013 | Kummetz et al. | |
| 2014/0243925 A1 | 8/2014 | Kothandaraman | |
| 2014/0269966 A1 | 9/2014 | Faccin et al. | |
| 2014/0313076 A1 | 10/2014 | Meerkerk et al. | |
| 2014/0314061 A1 | 10/2014 | Trajkovic et al. | |
| 2015/0012757 A1 | 1/2015 | Binder | |
| 2015/0078258 A1* | 3/2015 | Stewart | H04B 7/022 |
| | | | 370/328 |
| 2015/0082382 A1 | 3/2015 | Maguire et al. | |
| 2016/0329933 A1* | 11/2016 | Kummetz | H04L 49/40 |
| 2016/0352397 A1 | 12/2016 | Faccin et al. | |
| 2017/0023672 A1 | 1/2017 | Morrison | |
| 2017/0026199 A1* | 1/2017 | Dussmann | H04B 1/38 |
| 2017/0257151 A1 | 9/2017 | Lange | |
| 2017/0303337 A1* | 10/2017 | Dussmann | H04B 1/38 |
| 2017/0339126 A1 | 11/2017 | Maguire et al. | |
| 2017/0366386 A1 | 12/2017 | Kummetz et al. | |
| 2018/0026760 A1 | 1/2018 | Li | |
| 2018/0048357 A1 | 2/2018 | Stewart et al. | |
| 2018/0069607 A1 | 3/2018 | Faccin et al. | |
| 2018/0270204 A1 | 9/2018 | Binder | |
| 2018/0367188 A1 | 12/2018 | Kummetz et al. | |
| 2019/0327040 A1* | 10/2019 | Li | H04L 27/2613 |
| 2021/0100066 A1 | 4/2021 | Braun et al. | |
| 2022/0038126 A1* | 2/2022 | Kummetz | H01Q 1/246 |

OTHER PUBLICATIONS

Bjurel et al., "Ericsson's Integrated Site concept", Jan. 2005, pp. 1 through 10.

International Bureau, "International Preliminary Report on Patentability" from PCT Application No. PCT/US2020/052780, dated Apr. 7, 2022, from Foreign Counterpart to U.S. Appl. No. 17/033,013, pp. 1 through 6, Published in: WO.

International Searching Authority, "International Search Report and Written Opinion from PCT Application No. PCT/US2020/052780", from Foreign Counterpart to U.S. Appl. No. 17/033,013, Jan. 5, 2021, pp. 1 through 9, Published: WO.

U.S. Patent and Trademark Office, "Notice of Allowance", U.S. Appl. No. 17/033,013, Feb. 6, 2023, pp. 1 through 22, Published: US.

U.S. Patent and Trademark Office, "Notice of Allowance", U.S. Appl. No. 17/033,013, Feb. 7, 2022, pp. 1 through 19, Published: US.

U.S. Patent and Trademark Office, "Notice of Allowance", U.S. Appl. No. 17/033,013, Sep. 21, 2022, pp. 1 through 21, Published: US.

U.S. Patent and Trademark Office, "Notice of Allowance", U.S. Appl. No. 17/033,013, Oct. 7, 2021, pp. 1 through 19, Published: US.

(56) References Cited

OTHER PUBLICATIONS

U.S. Patent and Trademark Office, "Notice of Allowance", U.S. Appl. No. 17/033,013, Jun. 1, 2022, pp. 1 through 20, Published: US.

* cited by examiner

PASSIVE BACKPLANE ARCHITECTURE FOR MASTER UNIT OF DISTRIBUTED ANTENNA SYSTEM

CROSS-REFERENCE TO RELATED APPLICATIONS

This application claims the benefit of U.S. patent application Ser. No. 17/033,013 filed on Sep. 25, 2020, titled "PASSIVE BACKPLANE ARCHITECTURE FOR MASTER UNIT OF DISTRIBUTED ANTENNA SYSTEM", and U.S. Provisional Patent Application Ser. No. 62/906,602, filed on Sep. 26, 2019, same title, which are hereby incorporated herein by reference in its entirety.

BACKGROUND

A distributed antenna system (DAS) typically includes one or more master units that are communicatively coupled to a plurality of remote antenna units. Each remote antenna unit can be coupled directly to one or more of the master units or indirectly via one or more other remote antenna units and/or via one or more intermediary or expansion units. A DAS is typically used to improve the coverage provided by one or more base stations that are coupled to the master units. These base stations can be coupled to the master units via one or more cables or via a wireless connection, for example, using one or more donor antennas. The wireless service provided by the base stations can include commercial cellular service and/or private or public safety wireless communications.

In general, each master unit receives one or more downlink signals from one or more base stations and generates one or more downlink transport signals derived from one or more of the received downlink base station signals. Each master unit transmits one or more downlink transport signals to one or more of the remote antenna units. Each remote antenna unit typically serves one or more base stations coupled to the DAS. Each remote antenna unit receives the downlink transport signals transmitted to it from one or more master units and uses the received downlink transport signals to generate one or more downlink radio frequency signals for the base stations it serves. The downlink radio frequency signals are radiated from one or more coverage antennas associated with that remote antenna unit. The downlink radio frequency signals are radiated for reception by user equipment. Typically, downlink signals for each base station are simulcast from multiple remote antenna units serving that base station. In this way, the DAS increases the coverage area for the downlink capacity provided by the base stations.

Likewise, each remote antenna unit receives one or more uplink radio frequency signals transmitted from the user equipment that is communicating with the base stations served by that remote antenna unit. Each remote antenna unit generates one or more uplink transport signals derived from the one or more uplink radio frequency signals and transmits them to one or more of the master units. Each master unit receives the respective uplink transport signals transmitted to it from one or more remote antenna units and uses the received uplink transport signals to generate one or more uplink base station radio frequency signals that are provided to the one or more base stations coupled to that master unit. Typically, uplink signals received from the remote antenna units serving each base station are combined or summed in order to produce the base station signal provided to each base station. In this way, the DAS increases the coverage area for the uplink capacity provided by the base stations.

FIG. 1 is a block diagram illustrating one way to implement a master unit 100 of a DAS. In the example shown in FIG. 1, digital transport is used in the DAS. The master unit 100 typically includes one or more donor cards 102, one or more transport cards 104, and one or more active backplanes 106. In this example, each active backplane 106 comprises a plurality of slots, where either a donor card 102 or a transport card 104 can be inserted into each slot. Each active backplane 106 comprises a field programmable gate array (FPGA) 108 that is configured to process, format, and route data communicated between the donor cards 102 and transport cards 104. Also, each active backplane 106 comprises, for each slot into which either a donor card 102 or transport card 104 can be inserted, a respective backplane connector 110 that is used to couple that card 102 or 104 to the FPGA 108. Each backplane connector 110, in this example, includes multiple separate backplane channels 112 over which data can be separately communicated between the associated card 102 or 104 and the FPGA 108. In this example, each backplane connector 110 includes a respective backplane channel 112 for each external interface of the associated card 102 or 104 (that is, each base station interface 114 (described below) of a donor card 102 or each cable interface 116 (described below) of a transport card 104).

In the example shown in FIG. 1, each donor card 102 includes multiple base station interfaces 114 that are used to couple the master unit 100 (and the DAS more generally) to one or more base stations. In the example shown in FIG. 1, some of the donor cards 102 are configured to be coupled to the external analog radio frequency (RF) interface of a base station that would otherwise be used to couple the base station to one or more antennas (if a DAS were not used). These donor cards are also referred to here as "RF donor cards" 102. Also, in the example shown in FIG. 1, some of the donor cards 102 are configured to be coupled to a digital baseband interface used for fronthaul communications between a baseband unit (BBU) and each remote radio head (RRH) of a base station. Examples of such digital baseband interfaces include, without limitation, digital baseband interfaces complying with the Common Public Radio Interface ("CPRI") protocol, the Enhanced CPRI (eCPRI) protocol, the Open Radio Access Network (O-RAN) protocol, the Open Radio Equipment Interface ("ORI") protocol, the Open Base Station Standard Initiative ("OBSAI") protocol, or other protocol. These donor cards are also referred to here as "digital donor cards" 102.

In the example shown in FIG. 1, each transport card 104 includes multiple cable interfaces 116, each of which is used to couple the master unit 100 to one or more remote antenna units of the DAS (either directly or indirectly via one or more other remote antenna units and/or via one or more intermediary or expansion units). In the example shown in FIG. 1, some of the transport cards 104 are configured to communicate over optical cables and these transport cards 104 are also referred to here as "optical transport cards" 104. Also, in the example shown in FIG. 1, some of transport cards 104 are configured to communicate over copper cables (for example, twisted-pair cables or coaxial cables) and are also referred to here as "copper transport cards" 104. In this example, the copper transport cards 104 can also be configured to provide power to the remote antenna units (and any expansion units) over the copper cables (for example, using Power-over-Ethernet (POE) or direct current (DC) line-power techniques).

As noted above, each active backplane 106 comprises an FPGA 108 that is configured to process, format, and route data communicated between the donor cards 102 and transport cards 104. For each base station interface 114 of each RF donor card 102, the RF donor card 102 generates a respective stream of downlink digital samples from the analog downlink RF signals received from the base station coupled to that base station interface 114. For each base station interface 114 of each digital donor card 102, the digital donor card 102 terminates a respective stream of downlink digital samples received from a BBU of the base station coupled to that base station interface 114 via a digital baseband interface and, if necessary, converts (by re-sampling, synchronizing, combining, separating, gain adjusting, etc.) it into a stream of downlink digital samples compatible with the DAS. Each stream of downlink digital sample generated by a RF or digital donor card 102 is output to the FPGA 108 in the active backplane 106 via a respective backplane channel 112 of the backplane connector 110 to which that donor card 102 is connected. For each cable interface 116 of each transport card 104, the FPGA 108 of the active backplane 106 multiplexes (frames) the streams of downlink digital samples for the base stations served by the set of remote antenna units coupled to that cable interface 116 and outputs the multiplexed streams to that transport card 104 on the appropriate backplane channel 112 of the backplane connector 110 used to connect that transport card 104 to the active backplane 106. For each cable interface 116 of each transport card 104, the transport card 104 transmits the multiplexed streams of downlink digital samples to the set of remote antenna units coupled to that cable interface 116 via the attached cabling (and any intermediary devices).

For each cable interface 116 of each transport card 104, the transport card 104 receives multiplexed streams of uplink digital samples from the set of remote antenna units coupled to that cable interface 116 and outputs the multiplexed streams of uplink digital samples to the FPGA 108 of the active backplane 106 on the appropriate backplane channel 112 of the backplane connector 110 used connect that transport card 104 to the active backplane 106. For each base station interface 114 of each donor card 102, the FPGA 108 extracts the individual streams of uplink digital samples generated by the various remote antenna units serving the base station coupled to that base station interface 114, digitally sums the corresponding uplink digital samples from the various remote antenna units, and outputs the stream of summed uplink digital samples to the donor card 102 on the appropriate backplane channel 112 of the backplane connector 110 used to connect that donor card 102 to the active backplane 106. For each base station interface 114 of each RF donor card 102, the RF donor card 102 generates an analog uplink RF signal from the stream of summed uplink digital samples for the base station coupled to that base station interface 114 and outputs the resulting analog uplink RF signal to that base station. For each base station interface 114 of each digital donor card 102, the digital donor card 102 receives the stream of summed uplink digital samples for the base station coupled to that base station interface 114, if necessary, converts (by re-sampling, synchronizing, combining, separating, gain adjusting, etc.) it into a stream of uplink digital samples compatible with the digital baseband interface used by the BBU of the base station coupled to that digital donor card 102, and outputs the resulting stream of uplink digital samples to that BBU via the appropriate digital baseband interface.

In the example shown in FIG. 1, the active backplane 106 comprises eight slots into which cards 102 or 104 can be inserted. In one implementation of this example, the active backplane 106 is implemented in a form that is two rack units (RUs) in size. If the DAS requires a larger number of cards 102 or 104, a larger capacity activity backplane 106 can be used. FIG. 2 illustrates one example of an active backplane 106 that is scaled to include sixteen slots into which cards 102 or 104 can be inserted. In one implementation of this example, the active backplane 106 is implemented in a form that is four rack units (RUs) in size. If the DAS requires more cards 102 or 104 than can be accommodated by the largest capacity active backplane 106, two (or more) active backplanes 106 can be interconnected with each other using transport cards 104.

FIG. 3 illustrates one example how two active backplanes 106 of the type shown in FIG. 1 can be interconnected to each other in order to provide additional capacity for cards 102 or 104 in a master unit 100. In this example, a transport card 104 inserted into a slot of a first active backplane 106 is connected to a transport card 104 inserted into a slot of a second active backplane 106. These transport cards 104 are connected to each other using optical cables connected to one or more of the cables interfaces 116 of those transport cards 104. These transport cards 104 are also referred to here as the "interconnect" transport cards 104. In the example shown in FIG. 3, the interconnect transport cards 104 comprise optical transport cards 104; however, it is to be understood that copper transport cards 104 can also be used for the interconnect transport cards 104. If one or more base stations connected to the donor cards 102 of the first active backplane 106 need to be served by one or more remote antenna units coupled to the transport cards 104 of the second active backplane 106, the FPGA 108 in the first active backplane 106 processes and then routes the corresponding streams of digital samples for those base stations to and from the interconnect transport card 104 of the first active backplane 106, which sends and receives the streams of digital samples to the interconnect transport card 104 of the second active backplane 106. The FPGA 108 in the second active backplane 106 processes and then routes the corresponding streams of digital samples to and from the transport cards 104 of the second active backplane 106 that are coupled to the relevant remote antenna units.

While the approach to implementing a modular master unit 100 for a DAS illustrated in FIGS. 1-3 enables the number of donor cards 102 and transport cards 104 to be scaled depending on the number of base stations and remote antenna units actually used, the FPGA 108 used in each active backplane 106 must be provisioned with sufficient processing resources in order to support a configuration where cards 102 or 104 are inserted into all of the slots of the backplane 106. The FPGA 108 must support this maximum configuration even though in many real-word configurations cards 102 or 104 are not actually inserted into all of the slots of the backplane 106. As a result, the cost and processing power of the FPGA 108 in each active backplane 106 does not scale with the size of the DAS.

SUMMARY

One embodiment is directed to a master unit for a distributed antenna system (DAS) that also includes a plurality of remote antenna units. Each remote antenna unit serves one or more base stations. The master unit comprises one or more donor cards. Each donor card is configured to couple that donor card to at least one base station. The master unit further comprises one or more transport cards. Each transport card is configured to couple that transport card to one or more sets of remote antenna units. The master unit further comprises at least one passive backplane. Each passive backplane comprises a plurality of backplane connectors. Each of the backplane connectors is configured to connect a respective donor card or transport card to that passive backplane. Each of the backplane connectors is connected to each of the other connectors via one or more respective passive bi-directional backplane channels. The master unit is configured so that all active processing of streams of digital samples transported via the DAS is performed by the donor cards and transport cards and not the passive backplane.

Another embodiment is directed to a distributed antenna system (DAS) comprising a master unit coupled to one or more base stations and a plurality of remote antenna units. Each remote antenna unit serves one or more of the base stations. The master unit comprises one or more donor cards. Each donor card is configured to couple that donor card to at least one base station. The master unit further comprises one or more transport cards. Each transport card is configured to couple that transport card to one or more sets of remote antenna units. The master unit further comprises at least one passive backplane. Each passive backplane comprises a plurality of backplane connectors. Each of the backplane connectors is configured to connect a respective donor card or transport card to that passive backplane. Each of the backplane connectors is connected to each of the other connectors via one or more respective passive bi-directional backplane channels. The master unit is configured so that all active processing of streams of digital samples transported via the DAS is performed by the donor cards and transport cards and not the passive backplane.

Other embodiments are disclosed.

The details of various embodiments are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 4:
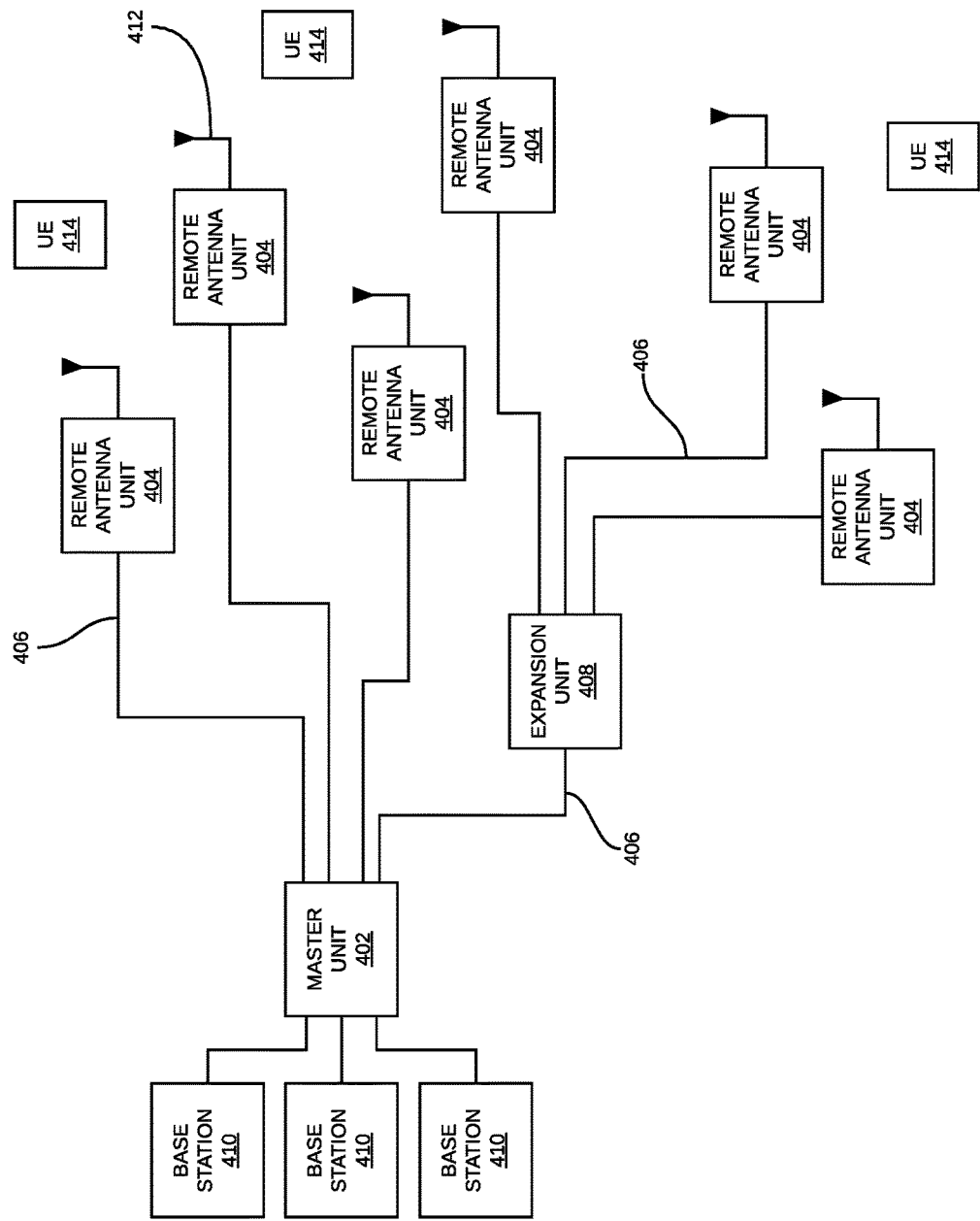
FIG. 4 is a block diagram illustrating one exemplary embodiment of a distributed antenna system in which the passive backplane described here can be used.

FIG. 4 is a block diagram illustrating one exemplary embodiment of a distributed antenna system 400 in which the passive backplane described here can be used.

The DAS 400 comprises one or more master units 402 that are communicatively coupled to one or more remote antenna units 404 via one or more cables 406. Each remote antenna unit 404 can be communicatively coupled directly to one or more of the master units 402 or indirectly via one or more other remote antenna units 404 and/or via one or more expansion (or other intermediary) units 408.

Each master unit 402 is communicatively coupled to one or more base stations 410. For example, each master unit 402 can be coupled to at least some of the base stations 410 via an external analog radio frequency (RF) interface of the base stations 410 that would otherwise be used to couple each base station 410 to one or more antennas (if a DAS were not used). Also, each master unit 402 can also be coupled to at least some of the base stations 410 via a digital baseband interface used for fronthaul communications between a BBU and each RRH of a base station. Examples of such digital baseband interfaces include, without limitation, digital baseband interfaces complying with the CPRI protocol, the eCPRI protocol, the O-RAN protocol, the ORI protocol, the OBSAI protocol, or other protocol. In the exemplary embodiment shown in FIG. 4, each master unit 402 is coupled to one or more base stations 410 via one or more cables. In other embodiments, each master unit 402 can be coupled to the base stations 410 in other ways (for example, wirelessly using one or more donor antennas).

The base stations 410 can also be coupled to the master units 402 using a network of attenuators, combiners, splitters, amplifiers, filters, cross-connects, etc., (sometimes referred to collectively as a "point-of-interface" or "POI"). This network can be included in the master units 402 and/or can be separate from the master units 402. This network can be used so that, in the downlink, the desired set of RF channels output by the base stations 410 can be extracted, combined, and routed to the appropriate master units 402, and so that, in the uplink, the desired set of carriers output by the master units 402 can be extracted, combined, and routed to the appropriate interface of each base station 410. It is to be understood, however, that this is one example and that other embodiments can be implemented in other ways.

In general, each master unit 402 receives one or more downlink base station signals from one or more base stations 410 and generates one or more downlink transport signals derived from one or more of the received downlink base station signals. Each master unit 402 transmits one or more downlink transport signals to one or more of the remote antenna units 404. Each remote antenna unit 404 typically serves one or more base stations 410 coupled to the DAS 400. Each remote antenna unit 404 receives the downlink transport signals transmitted to it from one or more master units 402 and uses the received downlink transport signals to generate one or more downlink radio frequency signals for the base stations 410 it serves. The downlink radio frequency signals are radiated from one or more coverage antennas 412 associated with that remote antenna unit 404.

The downlink radio frequency signals are radiated for reception by user equipment 414. Typically, downlink signals for each base station 410 are simulcast from multiple remote antenna units 404 serving that base station 410. In this way, the DAS 400 increases the coverage area for the downlink capacity provided by the base stations 410.

Likewise, each remote antenna unit 404 receives one or more uplink radio frequency signals transmitted from user equipment 414 communicating with the base stations 410 served by that remote antenna unit 404. Each remote antenna unit 404 generates one or more uplink transport signals derived from the one or more uplink radio frequency signals and transmits them to one or more of the master units 402. Each master unit 402 receives the respective uplink transport signals transmitted to it from one or more remote antenna units 404 and uses the received uplink transport signals to generate one or more uplink base station signals that are provided to the one or more base stations 410 coupled to that master unit 402. Typically, uplink signals received from multiple remote antenna units 404 serving each base station are combined or summed in order to produce the base station signal provided to that base station 410. In this way, the DAS 400 increases the coverage area for the uplink capacity provided by the base stations 410.

In this example, the DAS 400 uses digital transport.

Figure 5:
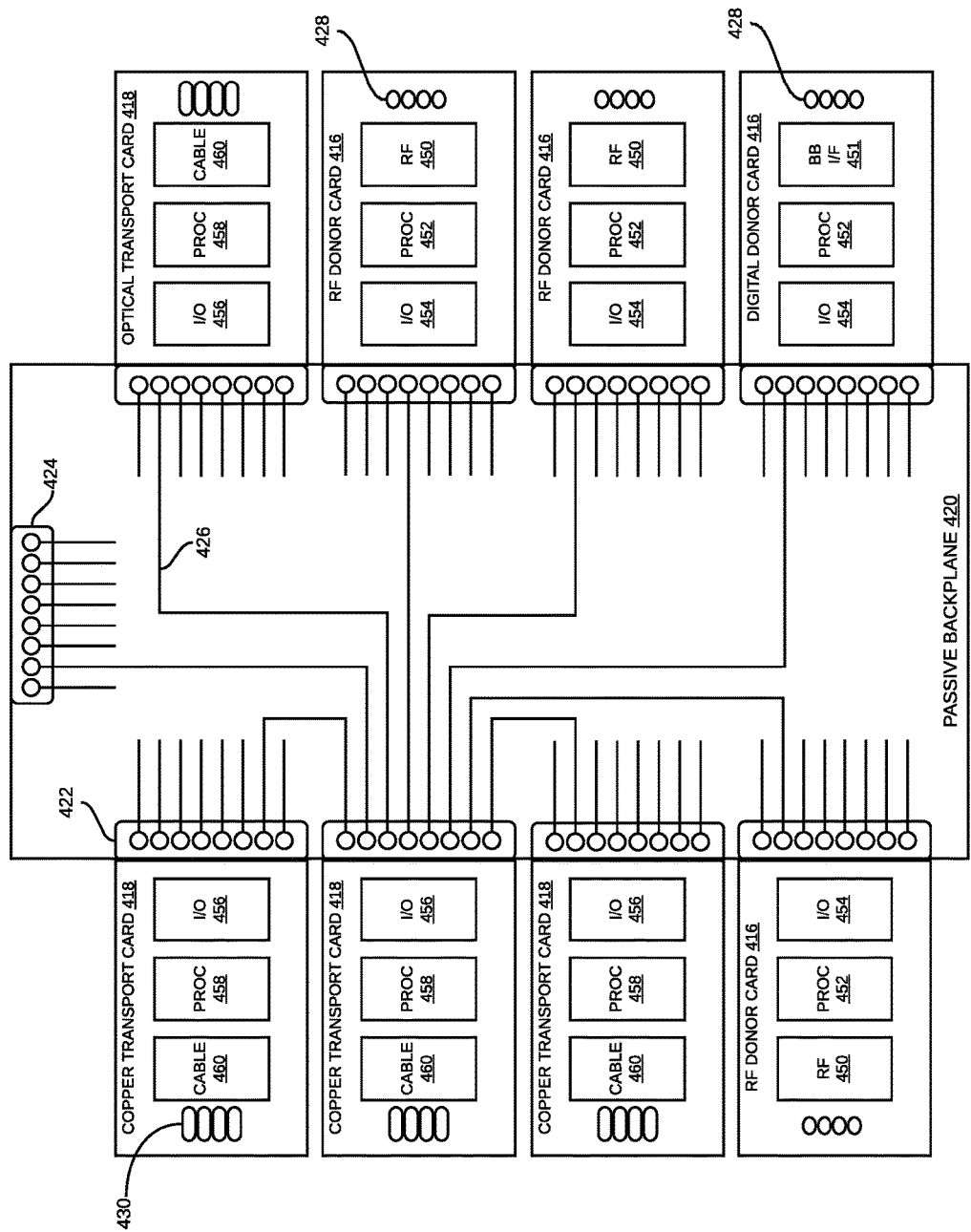
FIG. 5 is a block diagram illustrating one exemplary embodiment of the master unit of FIG. 4.

FIG. 5 is a block diagram illustrating one exemplary embodiment of the master unit 402 of FIG. 4.

The master unit 402 includes one or more donor cards 416, one or more transport cards 418, and a passive backplane 420. The passive backplane 420 comprises a plurality of slots, where either a donor card 416 or a transport card 418 can be inserted into each slot depending on the needs of that particular DAS 400 implementation.

Each passive backplane 420 comprises, for each slot into which either a donor card 416 or transport card 418 can be inserted, a respective backplane connector 422 that is used to couple that card 416 or 418 to the passive backplane 420. Each passive backplane 420 also comprises an expansion port 424 that is used for coupling that passive backplane 420 to the expansion port 424 of another passive backplane 420.

Each passive backplane 420 comprises one or more separate high-speed, passive, bi-directional backplane channels 426 between each backplane connector 422 and each other backplane connector 422 and the expansion port 424. Only some of the backplane channels 426 are shown in FIG. 5 for ease of illustration. In the example shown in FIG. 5, the passive backplane 420 comprises eight slots into which donor cards 416 or transport cards 418 can be inserted and one expansion port 424. Therefore, in this example, each backplane connector 422 is connected to the other seven backplane connectors 422 and the one expansion port 424 via one or more respective passive, high-speed, bi-directional backplane channels 426.

In the example shown in FIG. 5, each donor card 416 includes multiple base station interfaces 428 that are used to couple the master unit 402 (and the DAS 400 more generally) to one or more base stations 410. Each donor card 416 (among other things) is configured to generate one or more streams of digital samples from one or more downlink base station signals received from each base station 410 coupled to that donor card 416 and to generate one or more uplink base station signals from one or more uplink streams of digital samples, where the uplink base station signals are communicated to the base stations 410.

In the example shown in FIG. 5, some of the donor cards 416 are configured to be coupled to the external analog radio frequency (RF) interface of a base station 410. The external analog RF interface is the interface that would otherwise be used to couple the base station 420 to one or more antennas (if a DAS were not used). These donor cards 416 are also referred to here as "RF donor cards" 416. For the RF donor cards 416, the downlink and uplink base station signals comprise analog downlink and uplink RF signals.

Also, in the example shown in FIG. 5, some of the donor cards 416 are configured to be coupled to a baseband unit of a base station 410 using the digital baseband interface used for fronthaul communications between a BBU and each RRH. Examples of such digital baseband interfaces include, without limitation, digital baseband interfaces complying with the CPRI protocol, the eCPRI protocol, the O-RAN protocol, the ORI protocol, the OBSAI protocol, or other protocol. These donor cards 416 are also referred to here as "digital donor cards" 416. For the digital donor cards 416, the downlink and uplink base station signals comprise downlink and uplink digital baseband data (for example, downlink and uplink digital CPRI, eCPRI, O-RAN, ORI, or OBSAI baseband data).

In the example shown in FIG. 5, each transport card 418 includes multiple cable interfaces 430, each of which is used to couple the master unit 402 to one or more remote antenna units 404 of the DAS 400 (either directly or indirectly via one or more other remote antenna units 404 and/or via one or more intermediary or expansion units 408). In the example shown in FIG. 5, some of the transport cards 418 are configured to communicate over optical cables and these transport cards 418 are also referred to here as "optical transport cards" 418. Also, in the example shown in FIG. 5, some of the transport cards 418 are configured to communicate over copper cables (for example, twisted-pair cables or coaxial cables) and are also referred to here as "copper transport cards" 418. In this example, the copper transport cards 418 can also be configured to provide power to the remote antenna units 404 (and expansion units 408) over the copper cables (for example, using Power-over-Ethernet (POE) or direct current (DC) line-power techniques).

In this example, each passive backplane 420 comprises a dedicated slot (not shown) into which a system user interface card (not shown) can be inserted. The system user interface card is configured to implement a management interface for the DAS 400 and the cards 416 and 418 inserted therein. The passive backplane 420 is configured to couple each backplane connector 422 (and any card 416 or 418 connected thereto) to the system user interface card. The system user interface card also comprises one or more Ethernet interfaces via which external devices or systems can be coupled to the system user interface card in order to communicate with the management interface implemented for the DAS 400.

Figure 1:
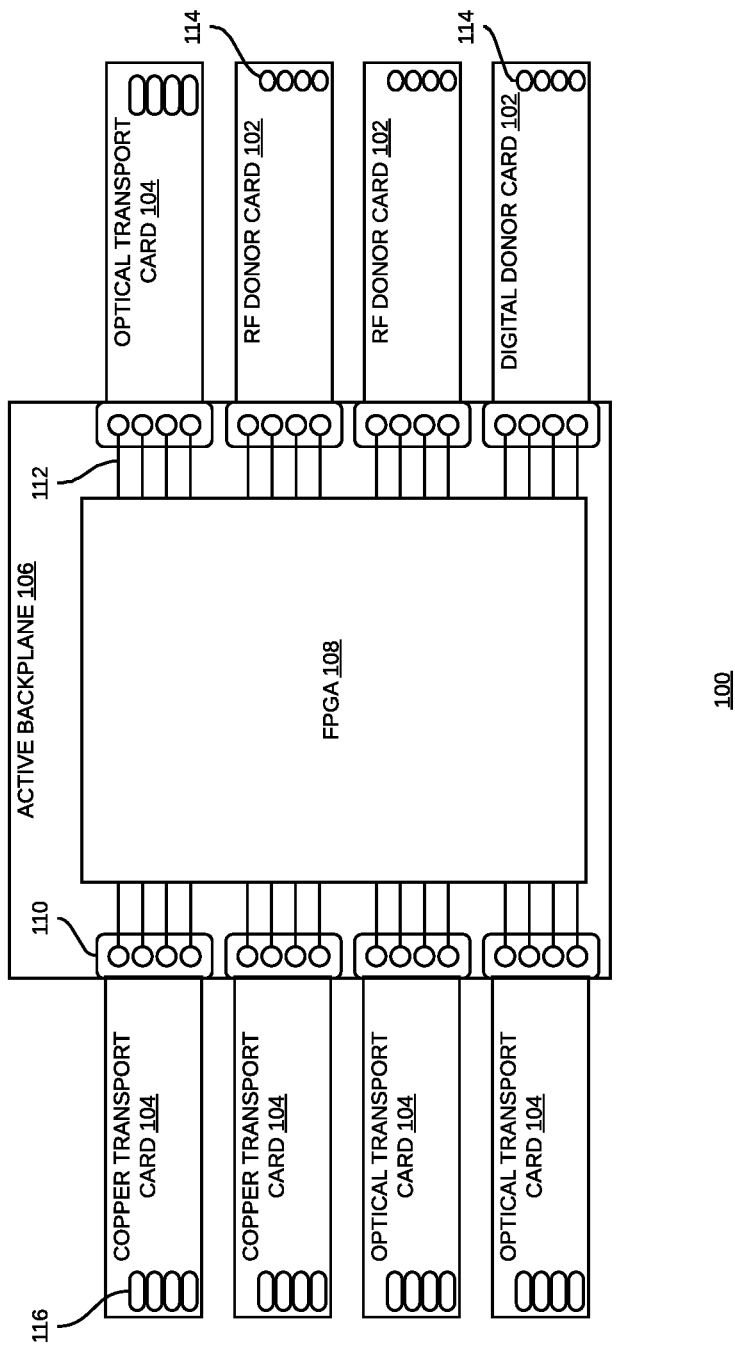
FIG. 1 is a block diagram illustrating one way to implement a master unit of a distributed antenna system.
Figure 2:
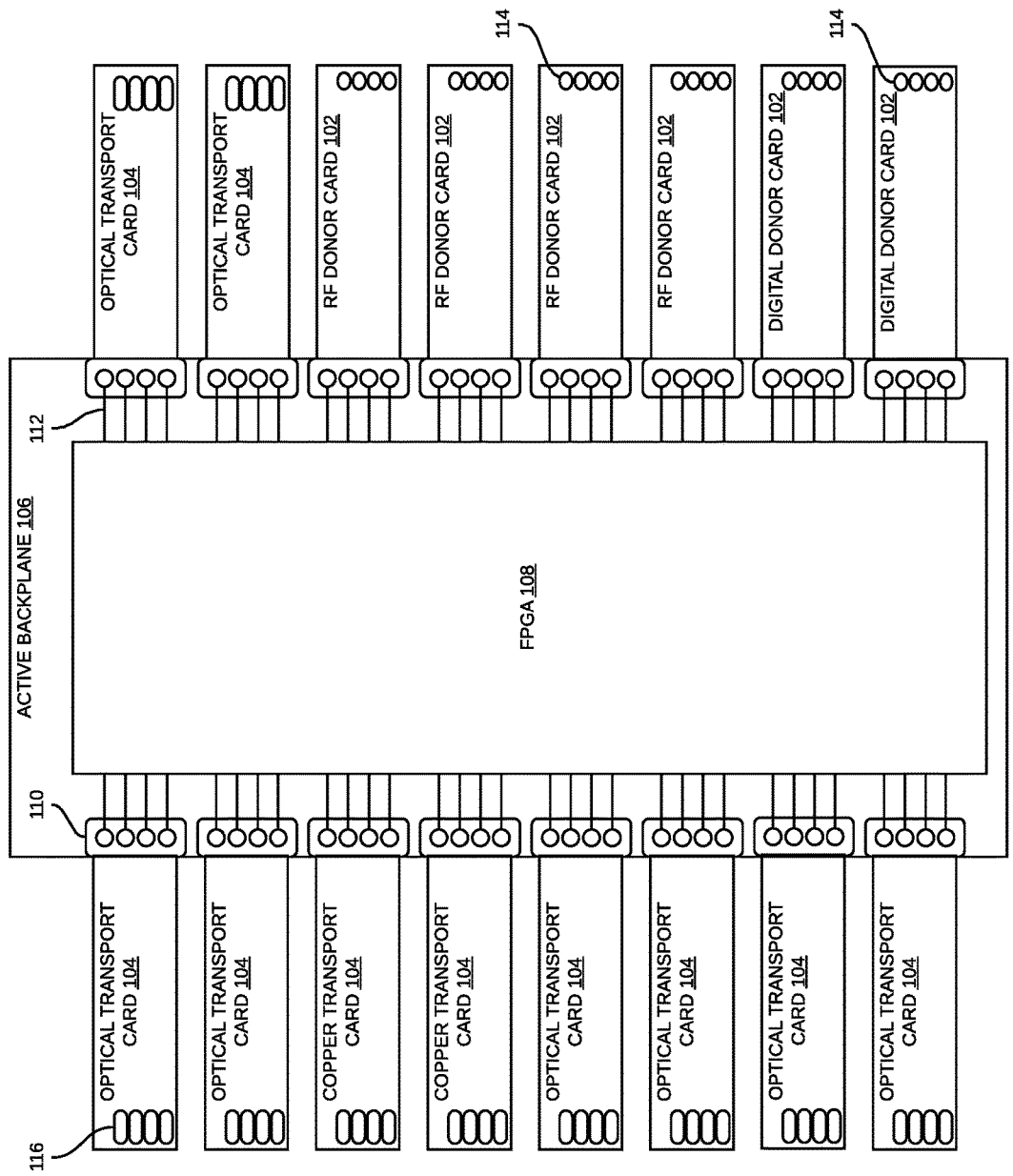
FIG. 2 illustrates one example of an active backplane that is scaled to include sixteen slots into which cards can be inserted.
Figure 3:
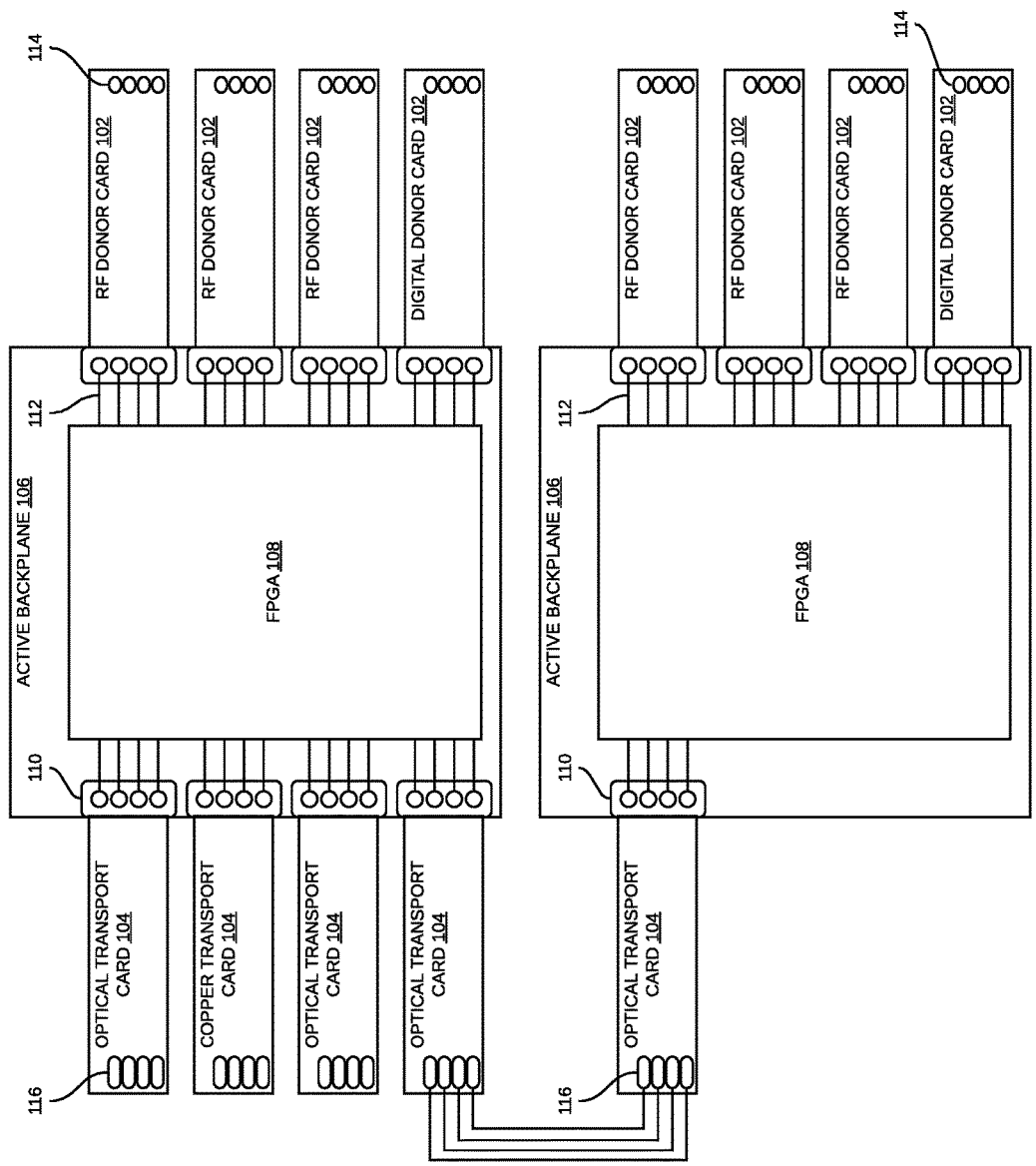
FIG. 3 illustrates one example how two active backplanes of the type shown in FIG. 1 can be interconnected to each other in order to provide additional capacity for cards in a master unit.

As noted above, in the example shown in FIG. 5, the backplane 420 comprises a passive backplane. The master unit 402 is configured so that all active processing of the digital samples transported via the DAS 400 is performed by the donor cards 416 and transport cards 418 and not the passive backplane 420. That is, the active processing of streams of digital samples that would be performed by the FPGA 108 of the active backplane 106 described above in connection with FIGS. 1-3 is not performed by the backplane 420 in the example shown in FIG. 5 but instead is performed in either the donor cards 416 or the transport cards 418.

In the example shown in FIG. 5, each RF donor card 416 comprises an RF front end 450, processing system 452, and input/output (I/O) transceivers 454, and each digital donor card 416 comprises one or more digital baseband interface devices 451 (for example, implemented using a chip set suitable for the digital baseband interface that includes, without limitation, a physical layer device (PHY) and media access control (MAC) device for that digital baseband interface), processing system 452, and input/output (I/O) transceivers 454. Also, In the example shown in FIG. 5, each transport card 418 comprises input/output (I/O) transceivers 456, processing system 458, and cable transceivers 460. Each donor card 416 and transport card 418 (and the components thereof) can be implemented at least in part using an FPGA and/or a system-on-chip (SOC).

As noted above, each donor card 416 is configured to generate one or more streams of digital samples from one or more downlink base station signals received from each base station 410 coupled to that donor card 416. In the example shown in FIG. 5 where the donor cards 416 comprise RF donor cards 416, the RF front end 450, for each base station interface 428, generates one or more streams of downlink digital samples from the one or more analog downlink RF signals received from the base station 410 coupled to that base station interface 428. In one implementation, these streams of downlink digital samples comprise digital in-phase and quadrature (IQ) samples. Also, in this implementation, the RF front-end 450 comprises, for each base station interface 428, a mixer to down-convert the analog downlink RF signals received from the base station 410 coupled to that base station interface 428 to an analog intermediate frequency (IF) signal, an analog-to-digital converter to digitize the analog IF signal in order to produce real downlink digital samples, and a digital downconverter (DDC) to digitally down-convert the real downlink digital samples to produce downlink digital in-phase and quadrature (IQ) samples. The resulting streams of downlink digital IQ samples for each base station interface 428 are provided to the processing system 452. The processing system 452, for each transport card 418 that is coupled to one or more remote antenna units 404 that serve one or more of the base stations 410 coupled to the associated donor card 416, multiplexes (frames) the streams of downlink digital IQ samples for those base stations 410, and outputs the multiplexed streams to the I/O transceivers 454. The I/O transceivers 454 communicate each set of multiplexed downlink streams on an appropriate backplane channel 426 of the backplane connector 422 used to connect that donor card 416 to the passive backplane 420. The I/O transceivers 454 communicate each set of multiplexed downlink streams over the passive backplane 420 to an appropriate transport card 418 or expansion port 424.

In the example shown in FIG. 5 where the donor cards 416 comprise digital donor cards 416, the one or more digital baseband interface devices 451, for each base station interface 428, terminate a respective stream of downlink digital samples received from a BBU of the base station coupled to that base station interface 428 via a digital baseband interface and provides the respective stream of downlink digital samples to the processing system 452 in that digital donor card 416. The processing system 452, if necessary, converts (by re-sampling, synchronizing, combining, separating, gain adjusting, etc.) the respective stream of downlink digital samples into a stream of downlink digital samples compatible with the DAS 400 and otherwise multiplexes and outputs the various streams of downlink digital samples as described above in connection with the RF donor card 416.

The I/O transceivers 456 in each transport card 418 are used to receive multiplexed streams of downlink digital IQ samples communicated to it from the various donor cards 416 via the respective backplane channels 426 of the backplane connector 422 used to connect that transport card 418 to the passive backplane 420. The processing system 458 in each transport card 418 extracts the individual streams of downlink digital samples from the received multiplexed streams of downlink digital samples. For each cable interface 430 of the transport card 418, the processing system 458 in the transport card 418 multiplexes (frames) the streams of downlink digital samples for the base stations 410 served by the remote antenna units 404 that are coupled to that cable interface 430 and a respective cable transceiver 460 in the transport card 418 transmits the set of multiplexed streams of downlink digital samples to the remote antenna units that are coupled to that cable interface 430 via the attached cables 406 (shown in FIG. 4) (and any intermediary devices).

The cable transceivers 460 of each transport card 418 receive multiplexed streams of uplink digital samples communicated to the transport card 418 from the various remote antenna units 404 coupled to the various cable interfaces 430 of that transport card 428. The processing system 458 in each transport card 418 extracts the individual streams of uplink digital samples from the received multiplexed streams of uplink digital samples. For each such base station 410 for which the transport card 418 has received streams of uplink digital samples from multiple remote antenna units 404, the processing system 458 in the transport card 418 digitally sums the extracted streams of uplink digital signals for that base station 410. For each donor card 416 that is coupled to one or more base stations 410 served by one or more of the remote antenna units 404 coupled to a given transport card 418, the processing system 458 in that transport card 418 multiplexes (frames) the streams of summed uplink digital samples for those base stations 410 and the respective I/O transceiver 456 in that transport card 418 outputs the set of multiplexed streams to that donor card 416 on the appropriate backplane channel 426 of the backplane connector 422 used to connect that transport card 418 to the passive backplane 420.

The I/O transceivers 454 in each donor card 416 receive multiplexed streams of summed uplink digital samples communicated to it from the various transport cards 418 via the respective backplane channels 426 of the backplane connector 422 used to connect that donor card 416 to the passive backplane 420. The processing system 452 in each donor card 416 extracts the individual streams of summed uplink digital samples from the received multiplexed streams of summed uplink digital samples. For each such base station 410 for which the donor card 416 has received streams of uplink digital samples from multiple transport cards 418, the processing system 458 in the donor card 416 digitally sums the extracted streams of summed uplink digital signals for the base station 410.

As noted above, each donor card 416 is configured to generate one or more uplink base station signals from one or more uplink streams of digital samples, where the uplink base station signals are communicated to the base stations 410. In the example shown in FIG. 5 where the donor cards 416 comprise RF donor cards 416, the RF front end 450, for each base station interface 428 of the RF donor card 416, generates a respective one or more analog uplink RF signals from the one or more streams of summed uplink digital samples output by the processing system 452 for the base station 410 coupled to that base station interface 428 and provides the analog uplink RF signal to that base station 410. In one implementation, the RF front end 450 comprises, for each base station interface 428, a digital upconverter (DUC) configured to digitally up-convert each stream of summed uplink digital IQ samples output by the processing system 452 in order to produce real uplink digital samples, a digital-to-analog converter in order to produce an analog uplink IF signal from the real uplink digital samples, and a mixer in order to up-convert the analog uplink IF signal to RF in order to produce each analog uplink RF signal that is provided to the base station 410 coupled to that base station interface 428.

In the example shown in FIG. 5 where the donor cards 416 comprise digital donor cards 416, the processing system 452 in each digital donor card 416 receives, extracts, and digitally sums the streams of summed uplink digital samples as described above in connection with the RF donor card 416 and, if necessary, converts (by re-sampling, synchronizing, combining, separating, gain adjusting, etc.) them into streams of uplink digital samples compatible with the digital baseband interface used by the BBUs of the base stations 410 coupled to that digital donor card 416. The one or more digital baseband interface devices 451, for each base station interface 428 of each digital donor card 416, communicate, to the BBU of the base station 410 coupled to that base station interface 428 using the appropriate digital baseband interface, the stream of summed uplink digital samples generated by the processing system 452.

In the example shown in FIG. 5, the passive backplane 420 comprises eight slots into which cards 416 or 418 can be inserted. If the DAS 400 requires a larger number of cards 416 or 418, two passive backplanes 420 can be connected to each other via their expansion ports 424 in order to form a larger capacity passive backplane assembly.

Figure 6:
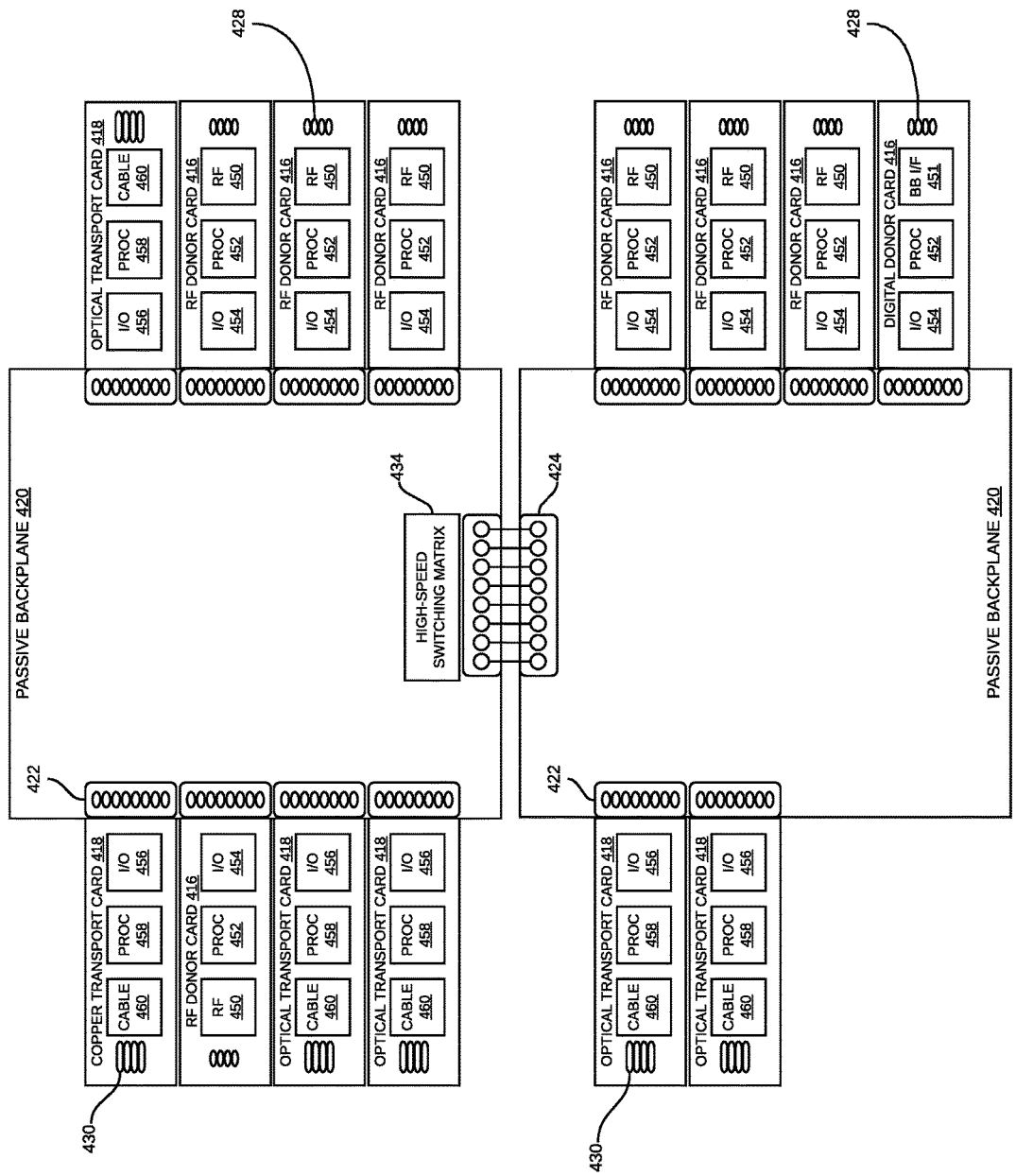
FIG. 6 illustrates one example of two passive backplanes that are connected to each other via their expansion ports in order to form a larger capacity passive backplane assembly.

FIG. 6 illustrates one example of two passive backplanes 420 that are connected to each other via their expansion ports 424 in order to form a larger capacity passive backplane assembly. In this example, the expansion ports 424 of each passive backplane 420 are connected to each other using appropriate board-to-board connectors. In the example shown in FIG. 6, one of the passive backplanes 420 comprises a high-speed switching matrix 434. The high-speed switching matrix 434 is configured to couple any backplane channel 426 of the expansion port 424 of a first passive backplane 420 to a single backplane channel 426 of the expansion port 424 of a second passive backplane 420. In this example, the first passive backplane 420 is configured to couple the high-speed switching matrix 434 to the system user interface card. The high-speed switching matrix 434 can be configured via the management interface implemented by the system user interface card. The high-speed switching matrix 434 can couple any donor card 416 inserted into a slot of one passive backplane 420 to any single transport card 418 inserted into a slot of the other passive backplane 420.

Figure 7:
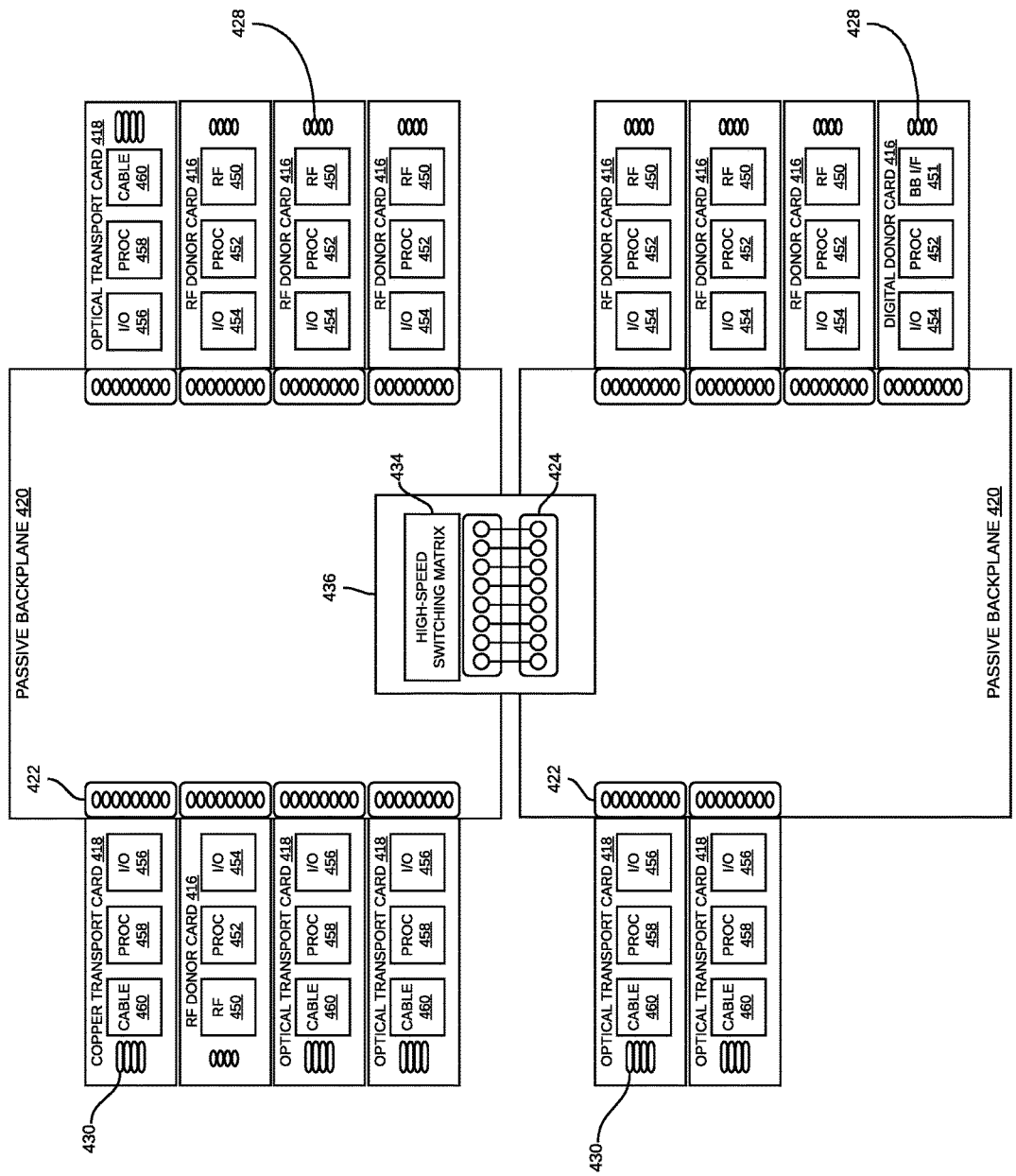
FIG. 7 illustrates a second example of two passive backplanes that are connected to each other via their expansion ports in order to form a larger capacity passive backplane assembly.

FIG. 7 illustrates a second example of two passive backplanes 420 that are connected to each other via their expansion ports 424 in order to form a larger capacity passive backplane assembly. The example shown in FIG. 7 is the same as the example shown in FIG. 6, except that the high-speed switch matrix 434 is mounted to a printed circuit board (PCB) 436 that is separate from the PCBs used to implement the two passive backplanes 420. In this example, matrix PCB 436 is connected to the expansion ports 424 of each passive backplane 420 using appropriate board-to-board connectors. In this example, the high-speed switch matrix 434 (and the associated matrix PCB 436) need only be deployed if needed to connect two passive backplanes 420 to each other via their expansion ports 424 in order to form a larger capacity passive backplane assembly. If that is not the case, the high-speed switch matrix 434 (and the associated matrix PCB 436) need not be deployed, thereby avoiding the cost associated therewith.

Figure 8:
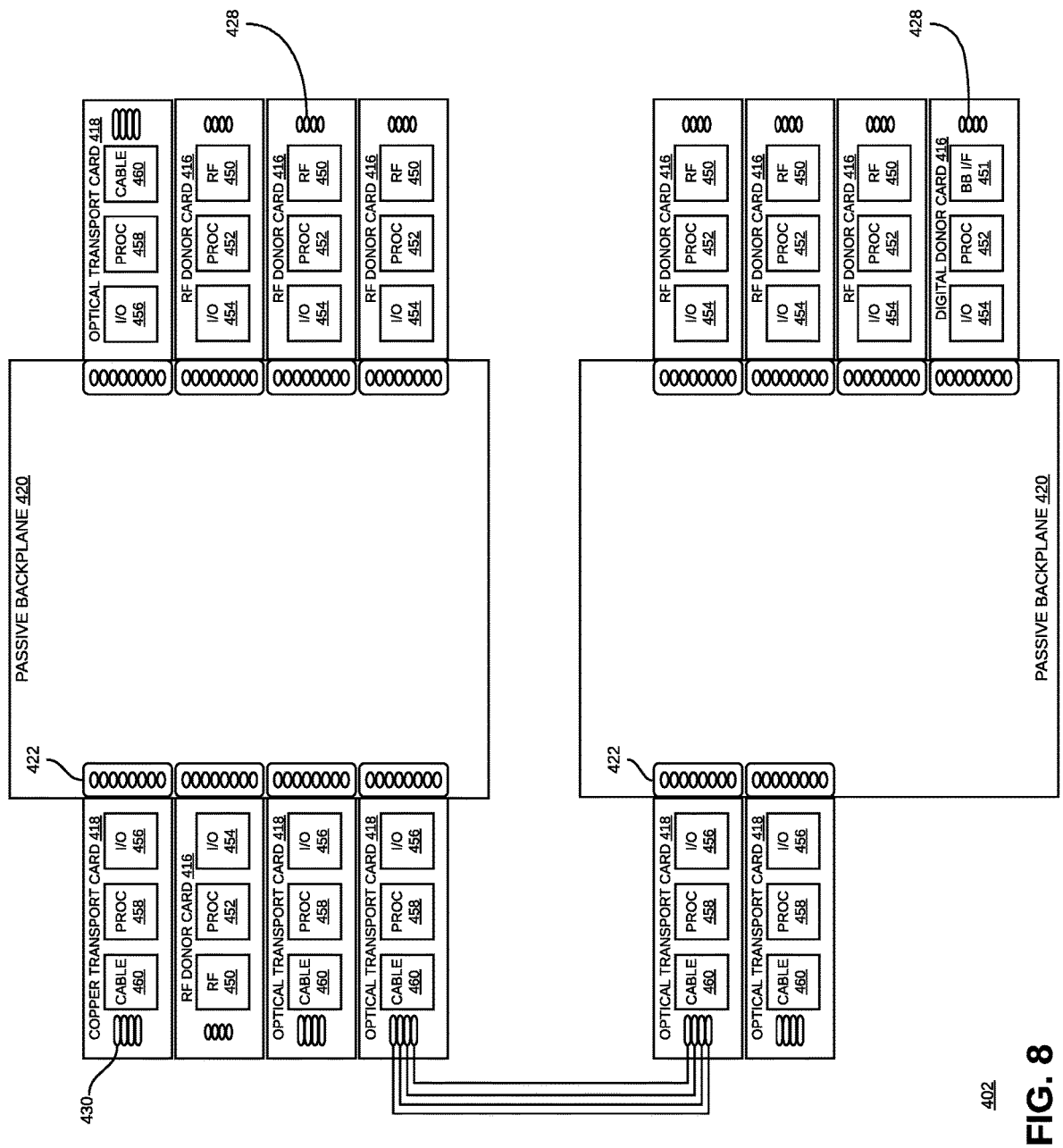
FIG. 8 illustrates one example of two passive backplanes that are connected to each other via transport cards inserted into the backplanes in order to form a larger capacity passive backplane assembly.

FIG. 8 illustrates one example of two passive backplanes 420 that are connected to each other via transport cards 418 inserted into the backplanes 420 in order to form a larger capacity passive backplane assembly. In this example, a transport card 418 inserted into a slot of a first passive backplane 420 is connected to a transport card 418 inserted into a slot of a second passive backplane 420 using optical cables connected to one or more of the cables interfaces 430 of those transport cards 418. These transport cards 418 are also referred to here as the "interconnect" transport cards 418. If one or more base stations 410 connected to the donor cards 416 of the first passive backplane 420 need to be served by one or more remote antenna units 404 coupled to the transport cards 418 of the second passive backplane 420, the interconnect transport card 418 of the first passive backplane 420 receives the corresponding streams of downlink digital samples for those base stations 410 from the appropriate donor cards 416 of the first passive backplane 420 and sends them to the interconnect transport card 418 of the second passive backplane 420, which sends the streams of downlink digital samples to the appropriate transport cards 418 of the second passive backplane 420. The interconnect transport card 418 in the second passive backplane 420 receives the corresponding streams of uplink digital samples from the appropriate transport card 418 of the second passive backplane 420 and sends them to the interconnect transport card 418 of the first passive backplane 420, which sends the streams of uplink digital samples to the appropriate donor cards 416 of the first passive backplane 420. Multiple transport cards 418 of each of the passive backplanes 420 can be used as interconnect transport cards 418 if necessary (depending on the amount of interconnect bandwidth that is needed).

While the approach shown in FIG. 8 provides a mechanism to connect two passive backplanes 420 to each other in order to form a larger capacity passive backplane assembly, this approach does so at the expense of losing the use of the slots in which the interconnect transport cards 418 are inserted.

The approach shown in FIG. 8 can also be combined with the approaches shown in FIGS. 6 and/or 7. For example, first and second passive backplanes 420 can be connected to each other via their expansion ports 424 as shown in FIG. 6 or 7, while the second passive backplane 420 can also be connected to a third passive backplane 420 via interconnect transport cards 418 inserted into the second and third passive backplanes 420 as shown in FIG. 8. The approach shown in FIG. 8 can also be used to couple a passive backplane 420 to multiple other passive backplanes 420.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a master unit for a distributed antenna system (DAS) that also includes a plurality of remote antenna units, each remote antenna unit serving one or more base stations, the master unit comprising: one or more donor cards, each donor card configured to couple that donor card to at least one base station; one or more transport cards, each transport card configured to couple that transport card to one or more sets of remote antenna units; and at least one passive backplane, each passive backplane comprising a plurality of backplane connectors, wherein each of the backplane connectors is configured to connect a respective donor card or transport card to that passive backplane, and wherein each of the backplane connectors is connected to each of the other connectors via one or more respective passive bi-directional backplane channels; wherein the master unit is configured so that all active processing of streams of digital samples transported via the DAS is performed by the donor cards and transport cards and not the passive backplane.

Example 2 includes the master unit of Example 1, wherein each of the backplane connectors is connected to each of the other connectors via one or more respective fixed passive bi-directional backplane channels.

Example 3 includes the master unit of any of Examples 1-2, wherein the active processing of the streams of digital samples for the base stations transported via the DAS comprises at least one of: generating downlink streams of digital samples for the base stations from downlink base station signals received from the base stations; multiplexing individual downlink streams of digital samples for communication to remote antenna units; receiving uplink streams of digital samples from remote antenna units; multiplexing individual streams of digital samples for communication to individual donor cards or transport cards over the passive backplane; extracting individual streams of digital samples from multiplexed streams of digital samples; digitally summing uplink streams of digital samples for the base stations; and generating uplink base station signals output to the base stations, the uplink base station signals generated from uplink streams of digital samples for the base stations.

Example 4 includes the master unit of any of Examples 1-3, wherein each donor card is configured to: for each base station connected to that donor card: receive one or more downlink base station signals from that base station; and generate one or more downlink streams of digital samples for that base station from the one or more downlink base station signal received from that base station; for each transport card that is coupled to one or more remote antenna units that serve one or more of the base stations coupled to that donor card: multiplex one or more of the downlink streams of digital samples generated by that donor card for communication to that transport card; and communicate the multiplexed downlink streams of digital samples to that transport card via the respective one or more passive backplane channels connected to the backplane connector used to connect that transport card to the respective passive backplane to which that transport card is connected; receive multiplexed uplink streams of digital samples from that transport card via the respective one or more passive backplane channels connected to the backplane connector used to connect that transport card to the respective passive backplane to which that transport card is connected; and extract individual uplink streams of digital samples from the multiplexed uplink streams of digital samples received from that transport card; for each base station connected to that donor card: digitally sum corresponding individual uplink streams of digital samples for that base station received via multiple transport cards; and generate one or more uplink base station signals for output to that base station, the one or more uplink base station signals generated from the corresponding one or more summed uplink streams of digital samples for the base station.

Example 5 includes the master unit of any of Examples 1-4, wherein each transport card is configured to: for each donor card that is connected to one or more base stations served by one or more of the remote antenna units coupled to that transport card: receive multiplexed downlink streams of digital samples from that donor card via the respective one or more passive backplane channels connected to the backplane connector used to connect that donor card to the respective passive backplane to which that donor card is connected; and extract individual downlink streams of digital samples from the multiplexed downlink streams of digital samples received from that donor card; and for each set of remote antenna units coupled to that transport card: multiplex the downlink streams of digital samples for that set of remote antenna units; communicate the multiplexed downlink streams of digital samples to that set of remote antenna units; receive multiplexed uplink streams of digital samples from that set of remote antenna units; extract individual uplink streams of digital samples from the multiplexed uplink streams of digital samples received from that set of remote antenna units; and for each base station served by a remote antenna unit coupled to that transport card: digitally sum corresponding individual uplink streams of digital samples for that base station received via multiple remote antenna units; and for each donor card that is connected to one or more base stations served by one or more of the remote antenna units coupled to that transport card: multiplex the summed uplink streams of digital samples for those one or more base stations for communication to that donor card; and communicate the multiplexed uplink streams of digital samples to that donor card via the respective one or more passive backplane channels connected to the backplane connector used to connect that donor card to the respective passive backplane to which that donor card is connected.

Example 6 includes the master unit of any of Examples 1-5, wherein each donor card comprises a plurality of base station interfaces configured to couple that donor card to a respective base station.

Example 7 includes the master unit of any of Examples 1-6, wherein each transport card comprises a plurality of cable interfaces, each cable interface configured to couple that transport card to a respective set of remote antenna units.

Example 8 includes the master unit of any of Examples 1-7, wherein at least one base station comprises a base station configured transmit and receive an analog downlink RF signal and an analog uplink RF signal; and wherein at least one of the donor cards comprises an RF donor card coupled to the base station.

Example 9 includes the master unit of any of Examples 1-8, wherein at least one base station comprises a baseband unit configured to transmit and receive downlink digital baseband data and uplink digital baseband data; and wherein at least one of the donor cards comprises a digital donor card coupled to the baseband unit.

Example 10 includes the master unit of any of Examples 1-9, wherein each passive backplane comprises an expansion port to which each backplane connector of that passive backplane is connected via a respective one or more passive backplane channels; and wherein the expansion port of each passive backplane is configured to be coupled to the expansion port of another passive backplane.

Example 11 includes the master unit of Example 10, wherein the expansion port of each passive backplane is configured to be coupled to the expansion port of another passive backplane via a high-speed switching matrix.

Example 12 includes the master unit of Example 11, wherein the high-speed switching matrix via which two passive backplanes are coupled to each is mounted directly on one of the passive backplanes.

Example 13 includes the master unit of any of Examples 11-12, wherein the high-speed switching matrix via which two passive backplanes are coupled to each is mounted to a separate printed circuit board that is coupled to the expansion ports of the two passive backplanes.

Example 14 includes the master unit of any of Examples 10-13, wherein the respective expansion port of a first passive backplane is coupled to a respective expansion port of a second passive backplane; and wherein a transport card in the second passive backplane is coupled to a transport card of a third passive backplane via one or more cables.

Example 15 includes the master unit of any of Examples 1-14, wherein a transport card in a first passive backplane is coupled to a transport card of a second backplane via one or more cables.

Example 16 includes the master unit of any of Examples 1-15, wherein the transport cards comprise at least one of: a copper transport card configured to couple copper cables to the master unit; and an optical transport card configured to couple optical cables to the master unit.

Example 17 includes the master unit of Example 16, wherein the copper transport card is configured to provide power to one or more downstream units over the copper cables.

Example 18 includes a distributed antenna system (DAS) comprising: a master unit coupled to one or more base stations; and a plurality of remote antenna units, each remote antenna unit serving one or more of the base stations; wherein the master unit comprises: one or more donor cards, each donor card configured to couple that donor card to at least one base station; one or more transport cards, each transport card configured to couple that transport card to one or more sets of remote antenna units; and at least one passive backplane, each passive backplane comprising a plurality of backplane connectors, wherein each of the backplane connectors is configured to connect a respective donor card or transport card to that passive backplane, and wherein each of the backplane connectors is connected to each of the other connectors via one or more respective passive bi-directional backplane channels; wherein the master unit is configured so that all active processing of streams of digital samples transported via the DAS is performed by the donor cards and transport cards and not the passive backplane.

Example 19 includes the DAS of Example 18, wherein each of the backplane connectors is connected to each of the other connectors via one or more respective fixed passive bi-directional backplane channels.

Example 20 includes the DAS of any of Examples 18-19, wherein the active processing of the streams of digital samples for the base stations transported via the DAS comprises at least one of: generating downlink streams of digital samples for the base stations from downlink base station signals received from the base stations; multiplexing individual downlink streams of digital samples for communication to remote antenna units; receiving uplink streams of digital samples from remote antenna units; multiplexing individual streams of digital samples for communication to individual donor cards or transport cards over the passive backplane; extracting individual streams of digital samples from multiplexed streams of digital samples; digitally summing uplink streams of digital samples for the base stations; and generating uplink base station signals for output to the base stations, the uplink base station signals generated from uplink streams of digital samples for the base stations.

Example 21 includes the DAS of any of Examples 18-20, wherein each donor card is configured to: for each base station connected to that donor card: receive one or more downlink base station signals from that base station; and generate one or more downlink streams of digital samples for that base station from the one or more downlink base station signal received from that base station; for each transport card that is coupled to one or more remote antenna units that serve one or more of the base stations coupled to that donor card: multiplex one or more of the downlink streams of digital samples generated by that donor card for communication to that transport card; and communicate the multiplexed downlink streams of digital samples to that transport card via the one or more respective passive backplane channels connected to the backplane connector used to connect that transport card to the respective passive backplane to which that transport card is connected; receive multiplexed uplink streams of digital samples from that transport card via the one or more respective passive backplane channels connected to the backplane connector used to connect that transport card to the respective passive backplane to which that transport card is connected; and extract individual uplink streams of digital samples from the multiplexed uplink streams of digital samples received from that transport card; for each base station connected to that donor card: digitally sum corresponding individual uplink streams of digital samples for that base station received via multiple transport cards; and generate one or more uplink base station signals for output to that base station, the one or more uplink base station signals generated from the corresponding one or more summed uplink streams of digital samples for the base station.

Example 22 includes the DAS of any of Examples 18-21, wherein each transport card is configured to: for each donor card that is connected to one or more base stations served by one or more of the remote antenna units coupled to that transport card: receive multiplexed downlink streams of digital samples from that donor card via the one or more respective passive backplane channels connected to the backplane connector used to connect that donor card to the respective passive backplane to which that donor card is connected; and extract individual downlink streams of digital samples from the multiplexed downlink streams of digital samples received from that donor card; and for each set of remote antenna units coupled to that transport card: multiplex the downlink streams of digital samples for that set of remote antenna units; communicate the multiplexed downlink streams of digital samples to that set of remote antenna units; receive multiplexed uplink streams of digital samples from that set of remote antenna units; extract individual uplink streams of digital samples from the multiplexed uplink streams of digital samples received from that set of remote antenna units; and for each base station served by a remote antenna unit coupled to that transport card: digitally sum corresponding individual uplink streams of digital samples for that base station received via multiple remote antenna units; and for each donor card that is connected to one or more base stations served by one or more of the remote antenna units coupled to that transport card: multiplex the summed uplink streams of digital samples for those one or more base stations for communication to that donor card; and communicate the multiplexed uplink streams of digital samples to that donor card via the one or more respective passive backplane channels connected to the backplane connector used to connect that donor card to the respective passive backplane to which that donor card is connected.

Example 23 includes the DAS of any of Examples 18-22, wherein each donor card comprises a plurality of base station interfaces configured to couple that donor card to a respective base station.

Example 24 includes the DAS of any of Examples 18-23, wherein each transport card comprises a plurality of cable interfaces, each cable interface configured to couple that transport card to a respective set of remote antenna units.

Example 25 includes the DAS of any of Examples 18-24, wherein at least one base station comprises a base station configured transmit and receive an analog downlink RF signal and an analog uplink RF signal; and wherein at least one of the donor cards comprises an RF donor card coupled to the base station.

Example 26 includes the DAS of any of Examples 18-25, wherein at least one base station comprises a baseband unit configured to transmit and receive downlink digital baseband data and uplink digital baseband data; and wherein at least one of the donor cards comprises a digital donor card coupled to the baseband unit.

Example 27 includes the DAS of Example 18, wherein each passive backplane comprises an expansion port to which each backplane connector of that passive backplane is connected via one or more respective passive backplane channels; and wherein the expansion port of each passive backplane is configured to be coupled to the expansion port of another passive backplane.

Example 28 includes the DAS of Example 27, wherein the expansion port of each passive backplane is configured to be coupled to the expansion port of another passive backplane via a high-speed switching matrix.

Example 29 includes the DAS of Example 28, wherein the high-speed switching matrix via which two passive backplanes are coupled to each is mounted directly on one of the passive backplanes.

Example 30 includes the DAS of any of Examples 28-29, wherein the high-speed switching matrix via which two passive backplanes are coupled to each is mounted to a separate printed circuit board that is coupled to the expansion ports of the two passive backplanes.

Example 31 includes the DAS of any of Examples 27-30, wherein the respective expansion port of a first passive backplane is coupled to a respective expansion port of a second passive backplane; and wherein a transport card in the second passive backplane is coupled to a transport card of a third passive backplane via one or more cables.

Example 32 includes the DAS of any of Examples 18-31, wherein a transport card in a first passive backplane is coupled to a transport card of a second backplane via one or more cables.

Example 33 includes the DAS of any of Examples 18-32, wherein the transport cards comprise at least one of: a copper transport card configured to couple copper cables to the master unit; and an optical transport card configured to couple optical cables to the master unit.

Example 34 includes the DAS of Example 33, wherein the copper transport card is configured to provide power to one or more downstream units over the copper cables.

What is claimed is:
1. A distributed antenna system (DAS) for use with one or more base stations, the DAS comprising:
 a plurality of remote antenna units, each remote antenna unit serving one or more of the base stations;
 one or more donor units, each donor unit configured to couple the DAS to at least one base station; and
 one or more transport units, each transport unit configured to couple that transport unit to one or more sets of remote antenna units, to transmit downlink transport signals to the one or more sets of remote antenna units, and to receive uplink transport signals from the one or more sets of remote antenna units;
 wherein the DAS is configured to communicatively couple each donor unit to at least one of the transport units and to communicatively couple each transport unit to at least one of the donor units;
 wherein the DAS is configured so that all active downlink digital processing for producing the downlink transport signals transmitted from the transport units to the remote antenna units is performed by the donor units and the transport units; and
 wherein the DAS is configured so that all active uplink digital processing of the uplink transport signals received by the transport units from the remote antenna units is performed by the donor units and the transport units.

2. The DAS of claim 1, wherein the active downlink digital processing for producing the downlink transport signals transmitted from the transport units to the remote antenna units comprises at least one of:
 generating downlink streams of digital samples for the base stations from downlink base station signals received from the base stations; and
 multiplexing individual downlink streams of digital samples for communication to remote antenna units; and
 wherein the active uplink digital processing of the uplink transport signals received by the transport units from the remote antenna units comprises at least one of:
 receiving uplink streams of digital samples from remote antenna units;
multiplexing individual streams of digital samples for communication to individual donor units or transport units;
 extracting individual streams of digital samples from multiplexed streams of digital samples;
 digitally summing uplink streams of digital samples for the base stations; and generating uplink base station signals for output to the base stations, the uplink base station signals generated from uplink streams of digital samples for the base stations.

3. The DAS of claim 1, wherein each donor unit is configured to:
for each base station connected to that donor unit:
receive one or more downlink base station signals from that base station; and
generate one or more downlink streams of digital samples for that base station from the one or more downlink base station signal received from that base station;
for each transport unit that is coupled to one or more remote antenna units that serve one or more of the base stations coupled to that donor unit:
multiplex one or more of the downlink streams of digital samples generated by that donor unit for communication to that transport unit; and
communicate the multiplexed downlink streams of digital samples to that transport unit;
receive multiplexed uplink streams of digital samples from that transport unit; and
extract individual uplink streams of digital samples from the multiplexed uplink streams of digital samples received from that transport unit;
for each base station connected to that donor unit:
digitally sum corresponding individual uplink streams of digital samples for that base station received via multiple remote antenna units; and
generate one or more uplink base station signals for output to that base station, the one or more uplink base station signals generated from the corresponding one or more summed uplink streams of digital samples for the base station.

4. The DAS of claim 1, wherein each transport unit is configured to:
for each donor unit that is connected to one or more base stations served by one or more of the remote antenna units coupled to that transport unit:
receive multiplexed downlink streams of digital samples from that donor unit; and
extract individual downlink streams of digital samples from the multiplexed downlink streams of digital samples received from that donor unit; and
for each set of remote antenna units coupled to that transport unit:
multiplex the downlink streams of digital samples for that set of remote antenna units;
communicate the multiplexed downlink streams of digital samples to that set of remote antenna units;
receive multiplexed uplink streams of digital samples from that set of remote antenna units;
extract individual uplink streams of digital samples from the multiplexed uplink streams of digital samples received from that set of remote antenna units; and
for each base station served by a remote antenna unit coupled to that transport unit:
digitally sum corresponding individual uplink streams of digital samples for that base station received via multiple remote antenna units; and
for each donor unit that is connected to one or more base stations served by one or more of the remote antenna units coupled to that transport unit:

multiplex the summed uplink streams of digital samples for those one or more base stations for communication to that donor unit; and
communicate the multiplexed uplink streams of digital samples to that donor unit.

5. The DAS of claim 1, wherein each donor unit comprises a plurality of base station interfaces configured to couple that donor unit to a respective base station.

6. The DAS of claim 1, wherein each transport unit comprises a plurality of cable interfaces, each cable interface configured to couple that transport unit to a respective set of remote antenna units.

7. The DAS of claim 1, wherein at least one base station comprises a base station configured transmit and receive an analog downlink RF signal and an analog uplink RF signal; and
wherein at least one of the donor units comprises an RF donor unit coupled to the base station.

8. The DAS of claim 1, wherein at least one base station comprises a baseband unit configured to transmit and receive downlink digital baseband data and uplink digital baseband data; and
wherein at least one of the donor units comprises a digital donor unit coupled to the baseband unit.

9. The DAS of claim 1, wherein the transport units comprise at least one of:
a copper transport unit configured to communicate with a set of remote antenna units using copper cables; and
an optical transport unit configured to communicate with a set of remote antenna units using optical cables.

10. The DAS of claim 9, wherein the copper transport unit is configured to provide power to one or more downstream units over the copper cables.

11. The DAS of claim 1, wherein the DAS further comprises a passive backplane.

12. A master unit for a distributed antenna system (DAS) that also includes a plurality of remote antenna units, each remote antenna unit serving one or more base stations, the master unit comprising:
one or more donor cards, each donor card configured to couple that donor card to at least one base station; and
one or more transport cards, each transport card configured to couple that transport card to one or more sets of remote antenna units; and
wherein the master unit is configured to communicatively couple each donor card to at least one of the transport cards and to communicatively couple each transport card to at least one of the donor cards;
wherein the master unit is configured so that all active downlink digital processing for producing the downlink transport signals transmitted from the transport units to the remote antenna units is performed by the donor units and the transport units; and
wherein the master unit is configured so that all active uplink digital processing of the uplink transport signals received by the transport units from the remote antenna units is performed by the donor units and the transport units.

13. The master unit of claim 12, wherein the active downlink digital processing for producing the downlink transport signals transmitted from the transport units to the remote antenna units comprises at least one of:
generating downlink streams of digital samples for the base stations from downlink base station signals received from the base stations; and multiplexing individual downlink streams of digital samples for communication to remote antenna units; and wherein the active uplink digital processing of the uplink transport signals received by the transport units from the remote antenna units comprises at least one of:

receiving uplink streams of digital samples from remote antenna units; multiplexing individual streams of digital samples for communication to individual donor units or transport units;

extracting individual streams of digital samples from multiplexed streams of digital samples;

digitally summing uplink streams of digital samples for the base stations; and generating uplink base station signals for output to the base stations, the uplink base station signals generated from uplink streams of digital samples for the base stations.

14. The master unit of claim 12, wherein each donor card is configured to:
for each base station connected to that donor card:
receive one or more downlink base station signals from that base station; and
generate one or more downlink streams of digital samples for that base station from the one or more downlink base station signal received from that base station;
for each transport card that is coupled to one or more remote antenna units that serve one or more of the base stations coupled to that donor card:
multiplex one or more of the downlink streams of digital samples generated by that donor card for communication to that transport card; and
communicate the multiplexed downlink streams of digital samples to that transport card;
receive multiplexed uplink streams of digital samples from that transport card; and
extract individual uplink streams of digital samples from the multiplexed uplink streams of digital samples received from that transport card;
for each base station connected to that donor card:
digitally sum corresponding individual uplink streams of digital samples for that base station received via multiple remote antenna units; and
generate one or more uplink base station signals for output to that base station, the one or more uplink base station signals generated from the corresponding one or more summed uplink streams of digital samples for the base station.

15. The master unit of claim 12, wherein each transport card is configured to:
for each donor card that is connected to one or more base stations served by one or more of the remote antenna units coupled to that transport card:
receive multiplexed downlink streams of digital samples from that donor card; and
extract individual downlink streams of digital samples from the multiplexed downlink streams of digital samples received from that donor card; and
for each set of remote antenna units coupled to that transport card:
multiplex the downlink streams of digital samples for that set of remote antenna units;
communicate the multiplexed downlink streams of digital samples to that set of remote antenna units;
receive multiplexed uplink streams of digital samples from that set of remote antenna units;
extract individual uplink streams of digital samples from the multiplexed uplink streams of digital samples received from that set of remote antenna units; and
for each base station served by a remote antenna unit coupled to that transport card:
digitally sum corresponding individual uplink streams of digital samples for that base station received via multiple remote antenna units; and
for each donor card that is connected to one or more base stations served by one or more of the remote antenna units coupled to that transport card:
multiplex the summed uplink streams of digital samples for those one or more base stations for communication to that donor card; and
communicate the multiplexed uplink streams of digital samples to that donor card.

16. The master unit of claim 12, wherein each donor card comprises a plurality of base station interfaces configured to couple that donor card to a respective base station.

17. The master unit of claim 12, wherein each transport card comprises a plurality of cable interfaces, each cable interface configured to couple that transport card to a respective set of remote antenna units.

18. The master unit of claim 12, wherein at least one base station comprises a base station configured transmit and receive an analog downlink RF signal and an analog uplink RF signal; and
wherein at least one of the donor cards comprises an RF donor card coupled to the base station.

19. The master unit of claim 12, wherein at least one base station comprises a baseband unit configured to transmit and receive downlink digital baseband data and uplink digital baseband data; and
wherein at least one of the donor cards comprises a digital donor card coupled to the baseband unit.

20. The master unit of claim 12, wherein the transport cards comprise at least one of:
a copper transport card configured to couple copper cables to the master unit; and
an optical transport card configured to couple optical cables to the master unit.

21. The master unit of claim 20, wherein the copper transport card is configured to provide power to one or more downstream units over the copper cables.

22. The master unit of claim 12, wherein the master unit further comprises a passive backplane.

23. A method for use with a distributed antenna system (DAS) and one or more base stations served by the DAS, the method comprising:
communicatively coupling each of one or more donor units of the DAS to at least one base station;
communicatively coupling each of one or more transport units of the DAS to one or more sets of remote antenna units;
communicatively coupling each donor unit to at least one of the transport units;
communicatively coupling each transport unit to at least one of the donor units;
performing, by the donor units and the transport units, all active downlink processing for producing the downlink transport signals transmitted from the transport units to the remote antenna units; and
performing, by the donor units and the transport units, all active uplink processing of the uplink transport signals received by the transport units from the remote antenna units.

24. The method of claim 23, wherein the active downlink digital processing for producing the downlink transport signals transmitted from the transport units to the remote antenna units comprises at least one of:
generating downlink streams of digital samples for the base stations from downlink base station signals received from the base stations; and
multiplexing individual downlink streams of digital samples for communication to remote antenna units; and
wherein the active uplink digital processing of the uplink transport signals received by the transport units from the remote antenna units comprises at least one of:
receiving uplink streams of digital samples from remote antenna units;
multiplexing individual streams of digital samples for communication to individual donor units or transport units;
extracting individual streams of digital samples from multiplexed streams of digital samples;
digitally summing uplink streams of digital samples for the base stations; and
generating uplink base station signals for output to the base stations, the uplink base station signals generated from uplink streams of digital samples for the base stations.

25. The method of claim 23, wherein each donor unit is configured to:
for each base station connected to that donor unit:
receive one or more downlink base station signals from that base station; and
generate one or more downlink streams of digital samples for that base station from the one or more downlink base station signal received from that base station;
for each transport unit that is coupled to one or more remote antenna units that serve one or more of the base stations coupled to that donor unit:
multiplex one or more of the downlink streams of digital samples generated by that donor unit for communication to that transport unit; and
communicate the multiplexed downlink streams of digital samples to that transport unit;
receive multiplexed uplink streams of digital samples from that transport unit; and
extract individual uplink streams of digital samples from the multiplexed uplink streams of digital samples received from that transport unit;
for each base station connected to that donor unit:
digitally sum corresponding individual uplink streams of digital samples for that base station received via multiple remote antenna units; and
generate one or more uplink base station signals for output to that base station, the one or more uplink base station signals generated from the corresponding one or more summed uplink streams of digital samples for the base station.

26. The method of claim 23, wherein each transport unit is configured to:
for each donor unit that is connected to one or more base stations served by one or more of the remote antenna units coupled to that transport unit:
receive multiplexed downlink streams of digital samples from that donor unit; and
extract individual downlink streams of digital samples from the multiplexed downlink streams of digital samples received from that donor unit; and
for each set of remote antenna units coupled to that transport unit:
multiplex the downlink streams of digital samples for that set of remote antenna units;
communicate the multiplexed downlink streams of digital samples to that set of remote antenna units;
receive multiplexed uplink streams of digital samples from that set of remote antenna units;
extract individual uplink streams of digital samples from the multiplexed uplink streams of digital samples received from that set of remote antenna units; and
for each base station served by a remote antenna unit coupled to that transport unit:
digitally sum corresponding individual uplink streams of digital samples for that base station received via multiple remote antenna units; and
for each donor unit that is connected to one or more base stations served by one or more of the remote antenna units coupled to that transport unit:
multiplex the summed uplink streams of digital samples for those one or more base stations for communication to that donor unit; and
communicate the multiplexed uplink streams of digital samples to that donor unit.

27. The method of claim 23, wherein each donor unit comprises a plurality of base station interfaces configured to couple that donor unit to a respective base station.

28. The method of claim 23, wherein each transport unit comprises a plurality of cable interfaces, each cable interface configured to couple that transport unit to a respective set of remote antenna units.

29. The method of claim 23, wherein at least one base station comprises a base station configured transmit and receive an analog downlink RF signal and an analog uplink RF signal; and
wherein at least one of the donor units comprises an RF donor unit coupled to the base station.

30. The method of claim 23, wherein at least one base station comprises a baseband unit configured to transmit and receive downlink digital baseband data and uplink digital baseband data; and
wherein at least one of the donor units comprises a digital donor unit coupled to the baseband unit.

31. The method of claim 23, wherein the transport units comprise at least one of:
a copper transport unit configured to communicate with a set of remote antenna units using copper cables; and
an optical transport unit configured to communicate with a set of remote antenna units using optical cables.

32. The method of claim 31, wherein the copper transport unit is configured to provide power to one or more downstream units over the copper cables.

33. The method of claim 23, wherein communicatively coupling each donor unit to at least one of the transport units comprises communicatively coupling each donor unit to at least one of the transport units using a passive backplane; and
wherein communicatively coupling each transport unit to at least one of the donor units comprises communicatively coupling each transport unit to at least one of the donor units using the passive backplane.

* * * * *